United States Patent
Willers et al.

(10) Patent No.: US 11,531,899 B2
(45) Date of Patent: Dec. 20, 2022

(54) METHOD FOR ESTIMATING A GLOBAL UNCERTAINTY OF A NEURAL NETWORK

(71) Applicant: Robert Bosch GmbH, Stuttgart (DE)

(72) Inventors: Oliver Willers, Korb (DE); Sebastian Sudholt, Neuenstadt am Kocher (DE); Shervin Raafatnia, Gerlingen (DE); Stephanie Abrecht, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 284 days.

(21) Appl. No.: 16/907,957

(22) Filed: Jun. 22, 2020

(65) Prior Publication Data

US 2020/0410364 A1 Dec. 31, 2020

(30) Foreign Application Priority Data

Jun. 28, 2019 (EP) ..................................... 19183368

(51) Int. Cl.
*G06N 3/08* (2006.01)
*G06N 3/04* (2006.01)

(52) U.S. Cl.
CPC ........... *G06N 3/088* (2013.01); *G06N 3/0454* (2013.01)

(58) Field of Classification Search
None
See application file for complete search history.

(56) References Cited

U.S. PATENT DOCUMENTS

| | | | | |
|---|---|---|---|---|
| 2019/0114544 | A1* | 4/2019 | Sundaram | G16B 40/00 |
| 2019/0304092 | A1* | 10/2019 | Akselrod-Ballin | G06T 7/13 |
| 2020/0202168 | A1* | 6/2020 | Mao | G06N 3/08 |
| 2020/0364562 | A1* | 11/2020 | Khoreva | G06N 3/08 |
| 2021/0406695 | A1* | 12/2021 | Pandarinath | G06N 3/084 |

OTHER PUBLICATIONS

Kendall and Gal.: "What Uncertainties Do We Need in Bayesian Deep Learning for Computer Vision?", Proceedings of the 31st Conference on Neural Information Processing Systems (NIPS 2017), Dec. 5, 2017, XP055651632, pp. 1-11.

(Continued)

*Primary Examiner* — Harry S Hong
(74) *Attorney, Agent, or Firm* — Norton Rose Fulbright US LLP; Gerard Messina (57) ABSTRACT

A method for estimating a global uncertainty of output data of a computer implemented main neural network. The method includes determining a first measure quantifying to which extent the current input data of the main neural network is following the same distribution as the data, which was used for training the main neural network; generating a second measure quantifying the main neural network's certainty in its own prediction based on the input data; ascertaining a third measure, based on an estimation of class-discriminative features in the input data and a comparison of these features with a class activation probability distribution, especially wherein the class activation probability distribution was created based on estimated class-discriminative features during the training of the main neural network; and determining the global uncertainty based on at least two measures of the first, second and third measure.

24 Claims, 3 Drawing Sheets

(56) References Cited

OTHER PUBLICATIONS

MsAllister, ety al.: "Robustness to Out-of-Distribution Inputs via Task-Aware Generative Uncertainty", 2019 International Conference on Robotics and Autmation (ICRA), IEEE, May 2019, pp. 2083-2089, XP033593515.
Rieger and Hansen.: "Aggregating explainability methods for neural networks stabilizes explanations", arxiv.org, Cornell University Library, 201 Olin Library Cornell University Ithaca, NY, Mar. 1, 2019, XP081122168, pp. 1-10.
Sedlmeier, et al.: "Uncertainty-Based Out-of-Distribution Detection in Deep Reinforcement Learning", arxiv.org, Cornell University Library, 201 Olin Library Cornell University Ithaca, NY, Jan. 8, 2019, XP081012427, pp. 1-6.
Selvaraju, et al.: "Grad-CAM: Visual Explanations from Deep Networks via Gradient-based Localization", 2017 IEEE International Conference on Computer Vision (ICCV), IEEE, Mar. 21, 2017, pp. 618-626, XP033282917.
Simonyan, et al.: "Deep Inside Convolutional Networks: Visualising Image Classification Models and Saliency Maps", Dec. 20, 2013, XP055226059, pp. 1-8.

\* cited by examiner

METHOD FOR ESTIMATING A GLOBAL UNCERTAINTY OF A NEURAL NETWORK

CROSS REFERENCE

The present application claims the benefit under 35 U.S.C. § 119 of European Patent Application No. EP 19183368.0 filed on Jun. 28, 2019, which is expressly incorporated herein by reference in its entirety.

FIELD

The present invention is directed to a method for estimating a global uncertainty of output data of a computer implemented neural network, a computer program, a computer readable storage device and an apparatus which is arranged to perform the method.

BACKGROUND INFORMATION

Deep neural networks (DNN) are state of the art and their application in various fields of technology is increasing.

With the use DNNs for safety-critical tasks, several problems arise for system safety. A fundamental problem of the safety of DNN modules is that the error of a DNN obtained on the test set can only be generalized to new and unseen samples under certain assumptions, which cannot be met in complex open context applications such as automated driving. Thus, sophisticated safety architectures including advanced safety measures are necessary in order to safeguard DNN components.

SUMMARY

The present invention provided a method for estimating a global uncertainty of output data of a computer implemented main neural network. In accordance with an example embodiment of the present invention, the method includes the following steps:

Determining a first measure (which will also be referred to as measure of confidence) quantifying to which extent the current input data of the main neural network is following the same distribution as the data, which was used for training the main neural network;

Generating a second measure (which will also be referred to as introspective uncertainty) quantifying the main neural network's certainty in its own prediction based on the input data, especially by using at least one Bayesian method, such as Bayesian neural networks, or an ensemble based approach.

Ascertaining a third measure (which will also be referred to as output uncertainty), based on an estimation of class-discriminative features in the input data and a comparison of these features with a class activation probability distribution, especially wherein the class activation probability distribution was created based on estimated class-discriminative features during the training of the main neural network;

Determining the global uncertainty based on at least two measures out of the first, second and third measure.

An aspect of the present invention is therefore the systematic combination of the three measures mentioned above into a single global uncertainty that enables effective safeguarding of perceptual systems.

The main neural network can be a deep neural network, wherein a deep neural network normally comprises at least an input layer, an output layer and at least one hidden layer. The network can be trained to classify data from sensor data of one or multiple sensors. A typical neural network can be designed and trained to detect objects based on images of a camera.

A Bayesian neural network is a special sub form of neural networks. Instead of scalar weights, Bayesian neural networks make use of distributions over weights. This approach allows them to output uncertainties for a given set of input data by design.

An ensemble of neural networks is a combination of multiple neural networks, which may be different in architecture or have different weights when using the same architecture. Typically, they are trained with different training sets. At test time, each net is evaluated on the given data individually and the different outputs are fused into a single output based on, e.g., a voting strategy (majority vote, minority vote, etc.). An ensemble's uncertainty can be measured by the variance of the individual outputs.

In another example implementation of the method in accordance with the present invention, the determination of the first measure is achieved by means of an autoencoder, more especially by means of a variational autoencoder.

In another example implementation of the method in accordance with the present invention, the autoencoder comprises an encoder and a decoder part. The encoder part is trained to map input data to a lower dimensional feature space, the so-called latent space, and the decoder part tries to reconstruct the original higher dimensional input from the latent space. The measure of confidence is based on a computation of a probability density value of the input data mapped to the latent space or on an estimated reconstruction error of the autoencoder. In a specific embodiment, the autoencoder is a variational autoencoder.

In another example implementation of the method in accordance with the present invention, the generation of the second measure is based on a Bayesian modelling of the main neural network. In a specific implementation of the method, the main neural network is modelled as Bayesian neural network. Bayesian modelling allows for an inherent integration of uncertainties into a specific model (in this case the neural network).

In another example implementation of the method in accordance with the present invention, the weights of the main neural network are modeled as distributions. Alternative possibilities are for example to use fixed values as weights.

Using distributions instead of fixed values opens the possibility to easily extract the second measure or the so called introspective uncertainty of the main neural network.

In another example implementation of the method in accordance with the present invention, the training of the main neural network is performed by means of variational inference. Variational inference allows for efficiently estimating the unknown posterior distribution of the weight distributions compared to other more expensive Bayesian optimization methods, especially Markov chain monte carlo.

In another example implementation of the method in accordance with the present invention, the main neural network is modelled as Bayesian neural network. The variational inference of the Bayesian neural network is performed by means of numeric integration, wherein the weight distributions are sampled n times and each sampled set of weights is used once in order to predict the n different outputs for a given input. The average of the sampled outputs is then used as prediction of the main neural network while the variance of the prediction is used for computing the second measure.

In order to perform inference in Bayesian neural networks, one needs to marginalize over the weight distributions, i.e., integrate them out. Doing this analytically is intractable which is why preferably inference in Bayesian neural networks resorts to numeric integration, i.e., an approximation of the integral over the weight distributions. Alternatively or additionally, an analytical calculation is also possible.

In another example implementation of the method in accordance with the present invention, the second measure is obtained by augmenting the neural network with a Gaussian Process.

This approach has the advantage, that uncertainties are created by design. Therefore the second measure can easily be extracted. Additionally, the training process can be split in two by separately training the neural network as feature extractor and the Gaussian process as regressor, especially for classification and regression problems. This reduces the complexity with respect to Bayesian neural networks.

The approach of using a neural network as feature extractor, which feeds its output to a Gaussian process, is also known as deep kernel learning in the literature if the neural network and the Gaussian process are trained combined. Another common name is deep Gaussian processes if the neural network and Gaussian processed are trained separately.

In another example implementation of the method in accordance with the present invention, the second measure is generated via an ensemble decision of at least two neural networks, especially with the two neural networks having different network architectures or having been trained using different training data sets. The benefit here would be that training the ensemble is not dependent on expensive optimization methods as are employed in Bayesian approaches.

In another example implementation of the method in accordance with the present invention, the second measure is generated via an ensemble decision of different machine learning methods, especially with at least one of these methods being a neural network.

Ensembles may also be constructed from different types of machine learning methods such as SVMs, Random Forests, Generalized Linear Models, and so on.

These further implementations open the possibility to choose between the different approaches. Depending on the design of the main neural network, the application of the network and further influence factors, the best approach for generation the second measure can be chosen.

In another example implementation of the method in accordance with the present invention, the class-discriminative features are estimated by computing scaled and/or unscaled features. A special approach lies in the use of activation heat maps. For this approach the Grad-Cam method can be used.

This approach allows for automatically detecting whether certain parts of the image were correctly classified by the neural network. Typically when employing heat map methods, the examination of the results has to be performed manually. This approach does away with any manual effort.

In another example implementation of the method in accordance with the present invention, scaled activation heat maps of detected objects are compared to class activation heat maps, which were computed for all detected objects during training and were then combined class-wise and/or pixel-wise in order to obtain the class activation probability distributions.

An advantage is again that evaluation of the obtained heat maps can be done automatically while the scaling introduces invariance with respect to unwanted values.

In another example implementation of the method in accordance with the present invention, the first, the second and the third measure are compared and the global uncertainty is set to the value of the three measures, which represents the least degree of confidence or wherein the global uncertainty is determined based on an average or any other kind of weighted sum of the first, second and third measure.

The measures can for example be normalized to a value between 0 and 1. 0 stands for no confidence at all, 1 for absolute confidence.

For the first measure, a low degree of confidence could equal a low correspondence between the distribution of input data and the distribution of training data, wherein a high degree of confidence equals a good correspondence.

For the second measure, the confidence can equal the confidence of the main neural network into its own predictions.

For the third measure, a low degree of confidence can equal a large deviation between the estimated class-discriminative feature and the class activation probability distribution, wherein a low deviation equals for a great degree of confidence.

In another example implementation of the method in accordance with the present invention, an at least partially automated robot, especially an at least partially automated car, is controlled, based on the global uncertainty.

An automated or automatically operated vehicle can be defined as a partially, highly or fully automatically operated vehicle. In particular, an automated vehicle may be a driverless vehicle that can be operated at least partially without human intervention. The vehicle can, for example, be a classic passenger car or a minibus or shuttle. The vehicle can also be another type of vehicle, such as a two or three wheeler, a boat, a train, an airplane, a drone or a helicopter.

The input data can for example originate from a camera, a radar, a lidar, a microphone, an ultrasonic sensor or any kind of other sensor.

In another example implementation of the method in accordance with the present invention, the path planning of the robot is based on the global uncertainty, so that areas of high uncertainty, especially compared to a predefined threshold, are avoided when controlling the robot, especially by maintaining a predefined distance to these areas.

An area of high uncertainty can be estimated by comparing the global uncertainty of a prediction of the neural network based on input data, which represents this area, to a predefined threshold. The level of high uncertainty can for example be reached, if the global uncertainty is greater than 0.9, on a scale from 0 to 1, wherein 0 stands for no confidence at all, 1 for absolute confidence. The predefined threshold value can be adjusted depending on several influencing factors, as the speed of the robot, the type of area the robot is located, the time, the weather, etc.

If the robot is a car, the different locations can equal different types of roads, like a highway, a main road, a pedestrian zone, etc.

The input data representing that area, can for example originate from sensors that scan the area. For example a camera, a lidar, a radar or an ultrasonic sensor.

In addition, the predefined distances can be adjusted depending on several influencing factors, as the speed of the robot or its position. The slower the robot, the smaller the predefined distance can be for example.

If the at least partially automated robot can be controlled by an operator, or in case of an at least partly automated car by a driver, the automated systems/robot could further choose to disengage and hand control back to the operator or driver or assume a safe state if the uncertainty about the sensor readings of the environment is too high or if navigation through the areas of high uncertainty is not possible or advised.

Alternatively, the at least partly automated or autonomous robot can also be another mobile robot, for example one that moves by flying, swimming, diving or walking. For example, the mobile robot can be at least a semi-autonomous lawn mower or at least a semi-autonomous cleaning robot. In these cases, the control signal can also be determined based on the global uncertainty of the prediction of a neural network.

In another alternative, the at least party autonomous robot can also be a garden robot that uses an imaging sensor and a neural network to determine a species or condition of plants in environment. The control signal can be determined depending on the predicted species or the determined condition of the plants and on the global uncertainty in such a way that a quantity of chemicals corresponding to the determined species or the determined condition is applied.

In other alternatives, the at least party autonomous robot can also be a household appliance, in particular a washing machine, stove, oven, microwave or dishwasher. With a sensor, for example an optical sensor, a condition of an object treated with the household appliance can be recorded, for example in the case of the washing machine a condition of laundry, which is in the washing machine. A neural network can then be used to determine the type or state of this object based on the data of the sensor. A control signal can then be determined in such a way that the household appliance is controlled depending on the determined type and/or the determined state of the object as well as a global uncertainty of this prediction. For example, in the case of the washing machine, it can be controlled depending on the material of which the laundry is made. To make sure, that no living creature is within in the washing machine, the global uncertainty helps to gain the needed high safety standards.

Additionally, in accordance with the present invention, a computer program is provided, comprising instructions, which, when the program is executed by a computer, cause the computer to carry out a method in accordance with the example embodiments of the present invention.

Additionally, in accordance with the present invention, a computer readable storage device is provided, on which this computer program is stored.

The present invention also provides a device that is designed to carry out, control or implement the steps of a variant of a procedure presented above. Also by this execution variant of the invention in form of a device the task underlying the invention can be solved fast and efficiently.

For this purpose, the device can have at least one computing unit for processing signals or data, at least one memory unit for storing signals or data, at least one interface to a sensor or an actuator for reading sensor signals from the sensor or for outputting data or control signals to the actuator and/or at least one communication interface for reading in or outputting data which are embedded in a communication protocol. The computing unit may be for example a signal processor, a microcontroller or the like, where the memory unit may be a flash memory, an EEPROM or a magnetic memory unit. The communication interface may be designed to read in or output data wirelessly and/or wired, whereby a communication interface which can read in or output wired data may, for example, read in or output this data electrically or optically from a corresponding data transmission line or output it into a corresponding data transmission line.

The device can be an electrical device that processes sensor signals and outputs control and/or data signals as a function of these signals. The device may have an interface which can be designed in terms of hardware and/or software. In the case of hardware-based training, the interfaces can be part of a so-called system ASIC, for example, which contains various functions of the device. However, it is also possible that the interfaces are integrated circuits of their own or consist at least in part of discrete components. In software training, the interfaces can be software modules that are, for example, present on a microcontroller alongside other software modules.

Additionally, in accordance with the present invention, a computer program is provided with program code which may be stored on a machine-readable carrier or storage medium such as a semiconductor memory, a hard disk memory or an optical memory and which is used to carry out, implement and/or control the steps of the process according to one of the forms of execution described above, in particular when the program product or program is executed on a computer or a device, is also advantageous.

The example method and safety architecture in accordance with the present invention can be used in any system in which deep neural networks are used in order to process one or multiple sensor inputs in order to obtain a virtual model of the environment, especially if the system is safety-critical. The use case would be to detect areas in the environment for which the correct representation cannot be obtained with an adequate amount of certainty (e.g., is there a human at point x in my environment).

DETAILED DESCRIPTION OF EXAMPLE EMBODIMENTS

During the last years, new and exciting applications were enabled by artificial intelligence and—more precisely—by machine learning algorithms. A well-known example for this is the fast growing field of automated driving. However, the transition from hands-on (Levels 1-2) driver assistance to hands-off automated driving (Levels 3-5) comes along with fundamental issues for system safety. Especially, the use of deep neural networks (DNNs) for safety-relevant tasks, e.g., video-based object detection and classification, creates completely new problems with respect to system safety.

A fundamental problem of the safety of DNN components is that the error of a DNN obtained on the test set can only be generalized to new and unseen samples if the new samples originate from the same distribution as the test data. Additionally, all samples need to be randomly chosen out of the "real world" distribution. Both requirements can hardly be fulfilled in practice since this would mean that:
1. the generated training and test data sets need to be perfect representations of the "real world",
2. the "real world" distribution would not change over time (no distributional shift over time).

Hence, it is of paramount importance for safe automated driving to consider the confidence of DNN's predictions in order to be able to indicate when an object detection model is unsure. For example, if a self-driving car recognizes a front object as a pedestrian but is uncertain about its location, the system may warn the driver to take over the car at an early stage or slow down to avoid fatal accidents. Since, it is well known that the output probabilities of DNNs' are not well calibrated, sophisticated safety architectures including advanced safety measures are necessary in order to safeguard DNN components.

As mentioned, with the use of DNNs for safety-critical tasks several problems arise for system safety. A fundamental problem of the safety of DNN modules is that the error of a DNN obtained on the test set can only be generalized to new and unseen samples under certain assumptions, which cannot be met in complex open context applications such as automated driving. Thus, sophisticated safety architectures including advanced safety measures are necessary in order to safeguard DNN components.

In the context of advanced driver assistance systems and automated driving, state-of-the-art plausibility checks are usually restricted to comparing multiple sensor outputs or analyzing the input data based on expert knowledge (e.g., to recognize difficult environmental conditions such as fog or reduced data quality such as motion blur). However, the output of DNNs depends on the probability distribution of its input data (e.g., the probability distribution of pixel-values in case of video-based object detection) and not necessarily on semantic units. As a result, the understanding of possible failure causes is quite hard and, at least, partly impossible even for domain experts In accordance with the present invention a sophisticated safety architecture is provided including several data-driven plausibility checks as well as introspective measures providing confidence about the predictions of DNN modules. The provided enhanced DNN module with uncertainties can be substituted everywhere where state-of-the-art DNNs are used. Possible areas of application are image recognition (camera images, radar images, lidar images, ultrasound images and especially combinations of these), noise classification and much more. They can be used for security applications (home security), applications in the automotive sector, in the space and aviation industry, for shipping and rail traffic.

The general idea of the safety architecture in accordance with the present invention for DNN modules is to determine during operation whether the current prediction of the DNN can be trusted or not. For this, a global confidence in the prediction is estimated through three individual measures of confidence, the first, the second and the third measure. The obtained confidence values (measures) are then fused together in order to obtain the global confidence. This global confidence value can then be used as input for a desired function.

The measures determined are described in more detail below:

The determined first measure is showing whether the current input data (e.g., an image) follows the same distribution as the training data set. This is necessary as the performance of a DNN can only be generalized to new data if the new data is from/follows the same distribution as the training data. Estimating whether new data stems from the training data distribution can require the estimation of a probability distribution for (potentially) high dimensional data. This can, for example, be achieved through standard autoencoders or variational autoencoders (VAE). These machine learning models consist of an encoder and a decoder part and can be trained in an unsupervised fashion. The encoder part is trained to map the input data to a low-dimensional feature space (also known as the latent space). The decoder part then tries to reconstruct the original high-dimensional input from the latent space. A VAE can be used in numerous ways for predicting whether new data stems from the same distribution as the data used for training the VAE. The most common approaches, though, revolve around either computing a probability density value of the new sample in latent space or using the reconstruction error of the VAE. While a low density value in the latent space indicates high confidence that the new data does not adhere to the training distribution, the same can be inferred for a large reconstruction error.

The generated second measure of the presented safety architecture is concerned with enabling the DNN to be able to express confidence for its predictions. Below, this module will be referred to as introspective measure. A DNN is usually unable to make statements about the certainty/uncertainty of its predictions. Even though the predicted probabilities could be used as uncertainty values, they are usually not well calibrated. In order to allow a DNN to predict uncertainties, it needs to be equipped with sophisticated additional methods. The most successful methods for this purpose make use of Bayesian modeling of neural networks, typically variational inference. Two possible methods for performing variational inference in deep neural networks are MC Dropout and Bayes-by-Backprop. The general idea in both approaches is to model the weights of the neural network as distributions instead of fixed values (i.e., point estimates). In order to obtain certainties/uncertainties of a prediction (e.g., classification) for a given input (e.g., image data), the weight distributions are sampled n times and each sampled set of weights is used once in order to predict n different outputs. The average of the sampled outputs is then used as prediction from the model while the variance of the predictions can be used for computing an uncertainty measure.

Instead of variational inference, the introspective uncertainty can also be obtained by attaching methods to an underlying DNN, which are able to predict uncertainties by design. This can, for example, be achieved through combining DNNs with Gaussian Processes.

Another method for generating introspective uncertainties is via an ensemble decision of several independent DNNs, which are either based on different architectures or have been trained using distinct training data sets.

The ascertained third measure can also be called output uncertainty. This measure is helpful in understanding how and why the network has come to a particular decision and then draw conclusions regarding its plausibility. Groups of methods which are useful for this purpose are visualization methods. They help to understand which features of the input have been important for making a prediction and therefore, help to uncover misleading bias and correlations as well as failure modes of a neural network. As an example, the Grad-Cam technique localizes and visualizes class-discriminative features in an input. This Grad-Cam technique is for example described in detail in the German Patent Application Nos. DE 102019209462 and DE 102019209463.

For example scaled activation heat maps can be computed for all detected objects during training. They are then combined class-wise and pixel-wise to obtain class activation probability distributions. Those can be used for plausibility checks on new objects. During run-time, scaled activation heat maps of detected objects are compared to the class activation probability distributions to determine if the sample belongs to or follows the distribution. A low likelihood value indicates a high output uncertainty.

The activation heat map can for example be calculated for all images in the training dataset and all detected objects of relevant classes, using a gradient based visualization method, e.g., Grad-Cam, and can be scaled to the corresponding bounding box. This can be necessary because the size of the detections varies greatly.

For each class, a probability distribution of the scaled activation can be calculated for each pixel inside and/or outside the bounding box: assuming that the probabilities are normally distributed, a multivariate Gaussian distribution is obtained by calculating an expected value and a standard deviation per pixel. This activation probability distribution per class is dependent on the training data and can be used for plausibility checks for detections in new data ("does the detection in the test image represent a deviation from seen data"). During the runtime, the activation for each detected object can be calculated, scaled and compared with the activation probability distribution of the respective class.

This method can mathematically be implemented by a calculation of the log-likelihood. The anomaly detection can be done by defining a threshold value for the log-likelihood. If the value falls below this value, an anomaly is present. In addition, the log-likelihood can depend on the values obtained in training and test, and can be scaled and outputted as a confidence value. The lower the value, the lower the confidence of the neural network, as the usually used image regions/features have not been used for the prediction of the neural network.

In the step of determining the global uncertainty at least two of the first, second and third measure obtained in the steps described above can be combined into one value indicating the global confidence of the main neural network about its result/prediction. This is a crucial knowledge for further functions/components, which take in the output of the DNN and use it to make safety-relevant decisions. It also helps choosing between different and possibly contradicting predictions in a system with redundancy on the sensor level.

The combination can happen in a number of ways. It is, for example possible, to enforce a conservative approach and let the one of the three measures (or only one of two measures) win, which predicts the least amount of confidence. In this case, only one probability is forwarded as combined probability (winner takes all).

Another approach would be to take an average or any other kind of weighted sum of the different uncertainty values (measures) in order to produce the combined value.

In the two approaches above, the combination of the measures rely on a rule-based approach incorporating expert knowledge about the individual uncertainty values/measures. Instead of this approach, it is also possible to learn a function, which takes as input at least two of the three measures and outputs the combined global uncertainty value. This function can, again be a neural network or any other kind of statistical method such as a Gaussian Process, Generalized Linear Model, Random Forest or the like. The only necessity for the applied method is that it is applied to map from the space of the at least two of the three measures to a space of combined uncertainty. This may require a training procedure for the function combining the uncertainty measures, which requires additional training data.

Figure 1:
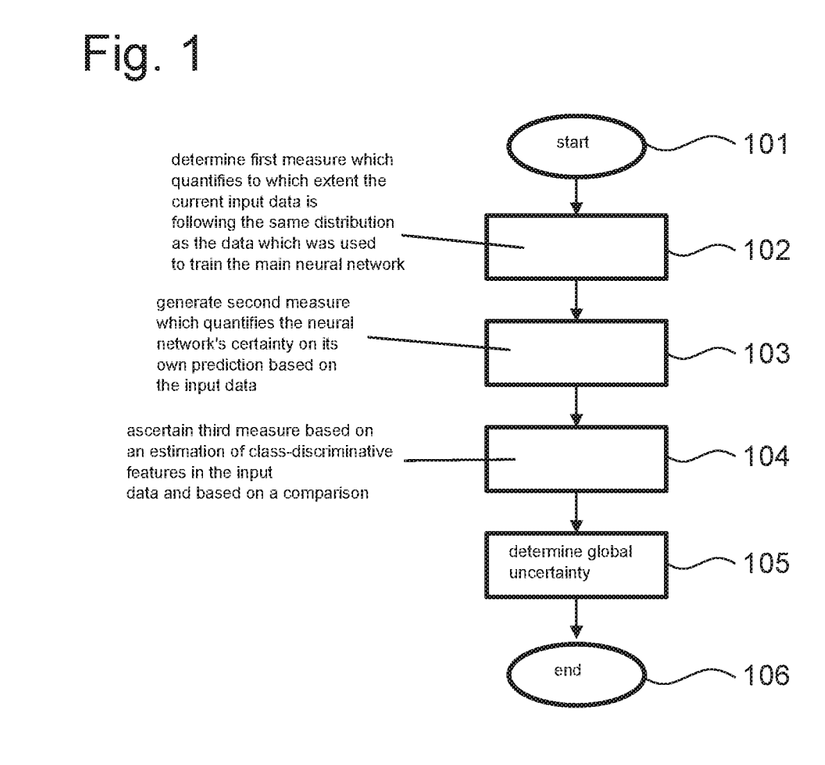
FIG. 1 shows a schematic flowchart in accordance with an example embodiment of the present invention.

FIG. 1 shows a first embodiment of the method for estimating a global uncertainty of output data of a computer implemented main neural network, in accordance with the present invention. In this example, the neural network is designed for detecting persons and especially for facial recognition for safety relevant applications. In this case authorized persons are detected by the neural network and based on the detection entry into a specific building is allowed or not allowed. In order to estimate the accuracy of the prediction of the neural network, the final decision is based on a global uncertainty of the statement of the neural network. The method for estimation this global uncertainty starts in step 101.

In step 102 a first measure is determined, which is quantifying to which extent the current input data of the neural network is following the same distribution as the data, which was used for training the main neural network. This is done by using a variation autoencoder. Therefore a probability density value of the new sample in latent space is computet. While a low density value in the latent space indicates high confidence that the new data does not adhere to the training distribution, the same can be inferred for a large reconstruction error.

In step 103 the second measure is generated, which is quantifying the neural network's certainty in its own prediction based on the input data. Therefore, the neural network is designed as Bayesian neural network. In order to obtain the second measure for a given input (e.g., image data with persons and their faces), the weight distributions of the network are sampled n times and each sampled set of weights is used once in order to predict n different outputs. The average of the sampled outputs is then used as prediction from the model while the variance of the predictions is used for computing the second measure.

In step 104 the third measure is ascertained, based on an estimation of class-discriminative features in the input data and a comparison of these features with a class activation probability distribution. This is done by the so called Grad-Cam technique. Therefore, scaled activation heat maps are computed for all detected objects and faces during training. They are then combined class-wise and pixel-wise to obtain class activation probability distributions. Those are then used for plausibility checks on new objects. During runtime, scaled activation heat maps of the detected objects are compared to the class activation probability distributions to determine if the sample belongs to or follows the distribution. A low likelihood value indicates a high output uncertainty.

In step 105 the global uncertainty is determined, based on at least two measures out of the first, second and third measure. In this example, all three measures are taken into account and a conservative approach is chosen. The measure, which represents the least amount of confidence defines the global uncertainty.

In this case, only one of the three measures is forwarded as combined probability/global uncertainty.

The method ends in step 106.

Figure 2:
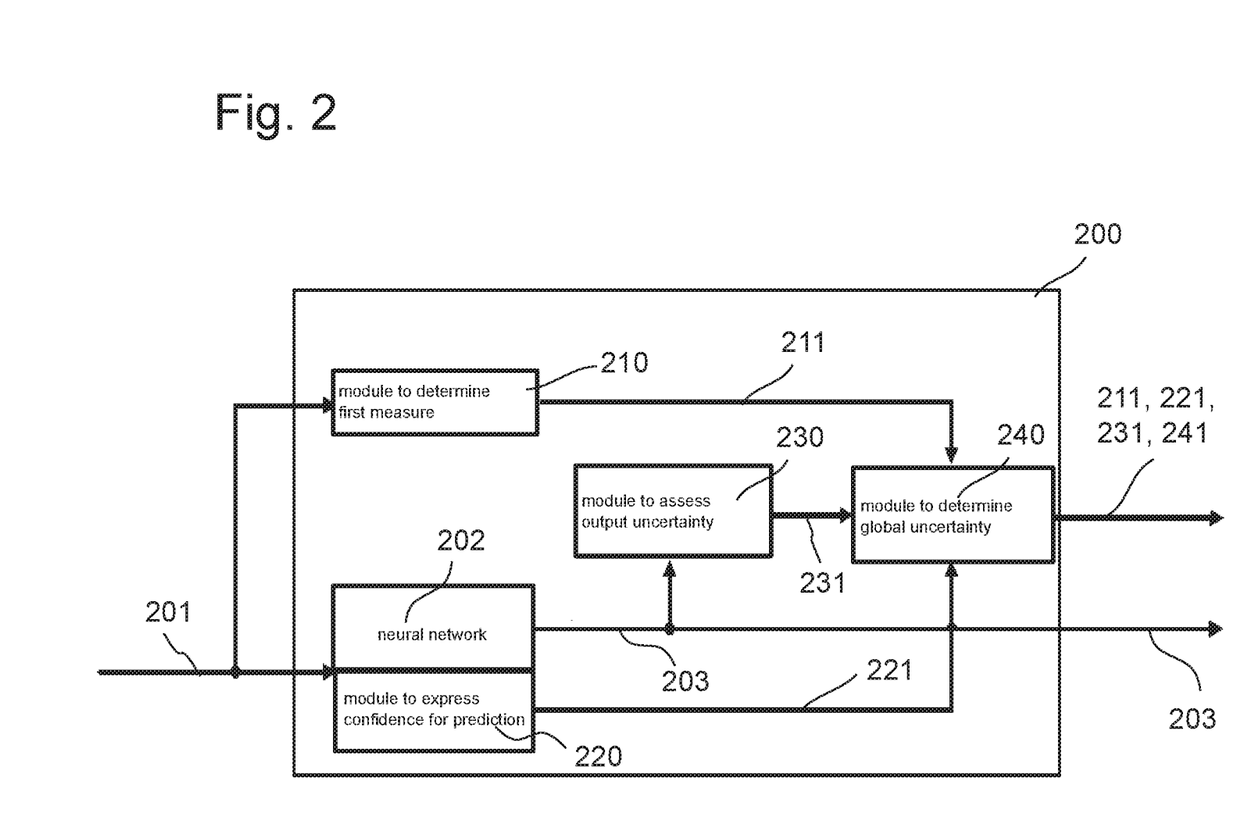
FIG. 2 shows a schematic illustration of a DNN module which is able to produce different kinds of uncertainties, in accordance with an example embodiment of the present invention.

In a second embodiment, the three different confidence measures (also referred to as first, second and third measure) and the global uncertainty are computed through four distinct modules, in this case different software modules, which run on the same vehicle control unit. The general approach is depicted in FIG. 2.

The example neural network module 200 comprises a neural network 202 and the four modules 210, 220, 230, 240.

Module 210 receives input data 201 and determines the first measure 211, showing whether the current input data follows the same distribution as the training data set.

Module 220 expresses the confidence for the prediction (the second measure 221) of the neural network.

Module 230 assesses the output uncertainty (third measure 231) based on the output data of the neural network 202.

Module 240 determines the global uncertainty 241 based on the first 211, second 221 and third 231 measure.

The neural network module 200 therefore receives input data 201 and outputs the output data 203 of the neural network 202 as well as uncertainties of the neural network, the first 211, second 221, and third 231 measure, as well as the global uncertainty 241. Depending on the application of this block, only the global uncertainty 241 or a combination of the different uncertainties (first, second, third measure and global uncertainty) can be given out.

Figure 3:
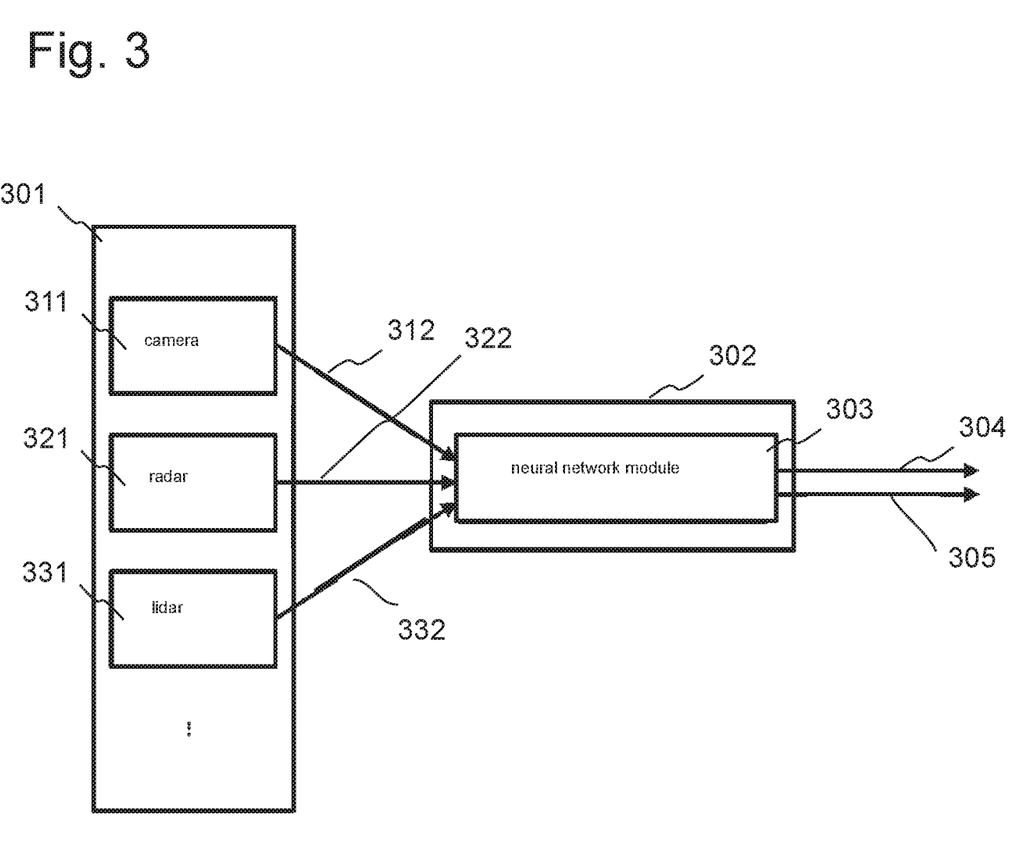
FIG. 3 shows a schematic illustration of how the DNN module with uncertainties can be used in an object detection system with early fusion of sensor data, in accordance with an example embodiment of the present invention.

FIG. 3 shows a schematic illustration of how the neural network module 200 described in FIG. 2, which represents a neural network, especially a DNN, module, which additionally to the output of the neural network outputs one or more uncertainty values, can be used in an object detection system with early fusion of sensor data.

301 describes a sensor block, comprising different sensors like a camera 311, a radar 321 and a lidar 331. In other embodiments different or additional sensors, like a microphone or an ultrasonic sensor can be used as well.

The different sensors 311, 321, 331 generate sensor data, like images 312, radar signatures 322 and 3D-scans from the lidar sensor 331. This sensor data is fused within block 302. In this example all sensor data 312, 322, 332 is fed into a neural network module 303 which is designed to output the predictions 305 of a neural network and uncertainties 304 about this prediction 305.

Object detections systems like this are especially important for driver assistance (DA) or automated driving (AD) functions. Due to the high safety requirements, the knowledge about the uncertainty of the predictions of neural networks, especially DNNs, is of high importance. For example, subsequent functions may enter a state of degradation depending on the magnitude of the global uncertainty.

What is claimed is:

1. A method for estimating a global uncertainty of output data of a computer implemented main neural network of an at least partially automated robot, comprising the following steps:
    determining a first measure which quantifies to which extent current input data of the main neural network is following the same distribution as data which was used for training the main neural network;
    generating a second measure which quantifies the main neural network's certainty in its own prediction based on the current input data;
    ascertaining a third measure, based on an estimation of class-discriminative features in the input data and a comparison of these features with a class activation probability distribution; and
    determining the global uncertainty based on at least two measures out of the first measure, the second measure, and the third measure, wherein the at least partially automated robot is controlled based on the global uncertainty.

2. The method according to claim 1, wherein second measure is generated using at least one Bayesian method of an ensemble based approach.

3. The method according to claim 1, wherein the class activation probability distribution is created based on estimated class-discriminative features during the training of the main neural network.

4. The method according to claim 1, wherein the determination of the first measure is achieved using an autoencoder.

5. The method according to claim 4, wherein the autoencoder is a variational autoencoder.

6. The method according to claim 4, wherein the autoencoder includes an encoder part and a decoder part, wherein the encoder part is trained to map input data to a lower dimensional feature space, the lower dimensional feature space being a latent space, and the decoder part tries to reconstruct the original higher dimensional input from the latent space, wherein the first measure is based on a computation of a probability density value of the input data mapped to the latent space or on an estimated reconstruction error of the autoencoder.

7. The method according to claim 6, wherein the autoencoder is a variational autoencoder.

8. The method according to claim 1, wherein the generation of the second measure is based on a Bayesian modelling of the main neural network.

9. The method according to claim 8, wherein the main neural network is modelled as a Bayesian neural network.

10. The method according to claim 8, wherein weights of the main neural network are modeled as distributions.

11. The method according to claim 10, wherein the training of the main neural network is performed using variational inference.

12. The method according to claim 11, wherein the main neural network is modelled as a Bayesian neural network wherein the variational inference of the Bayesian neural network is performed using numeric integration, wherein the weight distributions are sampled n times and each sampled set of weights is used once in order to predict the n different outputs for a given input, wherein an average of the sampled outputs is then used as a prediction of the main neural network while the variance of the prediction is used for computing the second measure.

13. The method according to claim 1, wherein the second measure is obtained by augmenting the main neural network with a Gaussian Process.

14. The method according to claim 1, wherein the second measure is generated via an ensemble decision of at least two neural networks.

15. The method according to claim 14, wherein the two neural networks have different network architectures or are trained using different training data sets.

16. The method according to claim 1, wherein the second measure is generated via an ensemble decision of different machine learning methods.

17. The method according to claim 16, wherein at least one of the learning methods is a neural network.

18. The method according to claim 1, wherein the class-discriminative features are estimated by computing scaled and/or unscaled features.

19. The method according to claim 18, wherein the class-discriminative features are estimated using activation heat maps by using a Grad-Cam method.

20. The method according to claim 19, wherein scaled activation heat maps of detected objects are compared to class activation heat maps, which were computed for all detected objects during training and are then combined class-wise and/or pixel-wise in to obtain the class activation probability distributions.

21. The method according to claim 1, wherein: (i) the first measure, the second measure, and the third measure are compared and the global uncertainty is set to a value of the three measures, which represents a least degree of confidence, or (99) the global uncertainty is determined based on an average or weighted sum of the first measure, the second measure, and the third measure.

22. The method according to claim 1, wherein the at least partially automated robot is an at least partly automated car.

23. The method according to claim 1, wherein a path planning of the robot is based on the global uncertainty, so that areas of high uncertainty, compared to a predefined threshold, are avoided when controlling the robot by maintaining a predefined distance to these areas.

24. A non-transitory computer-readable medium on which is stored a computer program including instructions for estimating a global uncertainty of output data of a computer implemented main neural network of an at least partially automated robot, the computer program, when executed by a compute, causing the computer to perform the following steps:

determining a first measure which quantifies to which extent current input data of the main neural network is following the same distribution as data which was used for training the main neural network;

generating a second measure which quantifies the main neural network's certainty in its own prediction based on the current input data;

ascertaining a third measure, based on an estimation of class-discriminative features in the input data and a comparison of these features with a class activation probability distribution; and determining the global uncertainty based on at least two measures out of the first measure, the second measure, and the third measure, wherein the at least partially automated robot is controlled based on the global uncertainty.

* * * * *